(12) United States Patent
Rodriguez et al.

(10) Patent No.: US 9,718,963 B2
(45) Date of Patent: Aug. 1, 2017

(54) CARBON BLACK REACTOR

(75) Inventors: Juan Rodriguez, Mumbai (IN); Bipul Sinha, Mumbai (IN); Vivek Vitankar, Mumbai (IN)

(73) Assignees: Aditya Birla Nuvo Limited, Mumbai, Maharashtra (IN); Aditya Birla Science and Technology Company Limited, Mumbai, Maharashtra (IN)

( * ) Notice: Subject to any disclaimer, the term of this patent is extended or adjusted under 35 U.S.C. 154(b) by 69 days.

(21) Appl. No.: 13/642,951

(22) PCT Filed: Apr. 19, 2011

(86) PCT No.: PCT/IN2011/000262
§ 371 (c)(1),
(2), (4) Date: Oct. 23, 2012

(87) PCT Pub. No.: WO2011/135579
PCT Pub. Date: Nov. 3, 2011

(65) Prior Publication Data
US 2013/0039840 A1 Feb. 14, 2013

(30) Foreign Application Priority Data
Apr. 27, 2010 (IN) .......................... 1344/MUM/2010

(51) Int. Cl.
*C09C 1/50* (2006.01)
(52) U.S. Cl.
CPC ..................... *C09C 1/50* (2013.01)
(58) Field of Classification Search
CPC ................... B01J 12/02; C09C 1/50
USPC ............ 423/449.1, 450, 456; 422/156
See application file for complete search history.

(56) References Cited

U.S. PATENT DOCUMENTS

| | | |
|---|---|---|
| 2,676,127 A | 4/1954 | Hansen |
| 3,172,729 A | 3/1965 | de Galocsy |
| 3,256,066 A | 6/1966 | Higgins |
| 3,607,058 A | 9/1971 | West et al. |
| 3,922,335 A | 11/1975 | Jordan et al. |
| 4,077,761 A * | 3/1978 | Dollinger et al. ............. 431/8 |
| 4,246,232 A | 1/1981 | Posch |
| 4,347,218 A | 8/1982 | Posch |
| 4,590,040 A | 5/1986 | King |
| 4,643,880 A * | 2/1987 | King et al. ............. 422/156 |
| 4,927,607 A | 5/1990 | Berg et al. |
| 4,988,493 A | 1/1991 | Norman et al. |
| 6,099,818 A | 8/2000 | Freund et al. |
| 6,358,487 B1 | 3/2002 | Omae et al. |
| 7,625,527 B2 | 12/2009 | Suzuki |
| 2004/0213728 A1 | 10/2004 | Kopietz et al. |
| 2005/0089454 A1 | 4/2005 | Suzuki |

FOREIGN PATENT DOCUMENTS

| | | |
|---|---|---|
| CN | 2341708 Y | 10/1999 |
| CN | 1529738 A | 9/2004 |
| CN | 101358042 A | 2/2009 |
| EP | 0033954 A2 | 8/1981 |
| GB | 699406 A | 11/1953 |
| JP | S48-020712 | 2/1973 |
| JP | S47-022894 | 9/1973 |
| JP | S53-11895 A | 10/1978 |
| JP | H01-230677 A | 9/1989 |
| JP | H04-264165 A | 9/1992 |
| JP | H04-264195 A | 9/1992 |
| JP | H10-168338 A | 6/1998 |
| JP | 2001-262001 A | 9/2001 |
| JP | 2005-307172 A | 11/2005 |
| JP | 2006-111643 A | 4/2006 |
| JP | 2007-277339 A | 10/2007 |
| JP | 2009-167288 A | 7/2009 |
| JP | 2010-144003 A | 7/2010 |
| WO | WO-03/000804 A1 | 1/2003 |

OTHER PUBLICATIONS

International Search Report (in English) for PCT/IN2011/000262, mailed Nov. 3, 2011; ISA/CN.
First Office Action issued on Dec. 20, 2013 by the State IP Office for the People's Republic of China for application 201180021230.0, filed on Apr. 19, 2011 and published as 2013121701460230 (Applicant—Aditya Birla Nuvo Limited, et al. // Inventor—Rodriguez, et al.) (Original—7 pages // Translation—11 pages).
Second Office Action issued on Oct. 11, 2014 by the State IP Office for the People's Republic of China for application 201180021230.0. filed on Apr. 19, 2011 and published as 2013121701460230 (Applicant—Aditya Birla Nuvo Limited, et al. // Inventor—Rodriguez, et al.) (Original—5 pages // Translation—11 pages).
Third Office Action issued on Jun. 24, 2015 by the State IP Office for the People's Republic of China for application 201180021230.0, filed on Apr. 19, 2011 and published as 2013121701460230 (Applicant—Aditya Birla Nuvo Limited, et al. // Inventor—Rodriguez, et al.) (Original—5 pages // Translation—8 pages).
Fourth Office Action issued on Mar. 3, 2016 by the State IP Office for the People's Republic of China for application 201180021230.0, filed on Apr. 19, 2011 and published as 20131270146230 (Applicant—Aditya Birla Nuvo Limited, et al. //Inventor—Rodriguez, et al.) (Original—5 pages // Translation—8 pages).
Extended European Search Report issued on Sep. 8, 2015 for application EP 1177454.06, filed on Apr. 19, 2011 (Applicant—Aditya Birla Nuvo Limited, et al. //Inventor—Rodriguez, et al.) (6 pages).

(Continued)

*Primary Examiner* — Stuart Hendrickson
(74) *Attorney, Agent, or Firm* — Ballard Spahr LLP

(57) ABSTRACT

The present invention discloses a reactor (100) for manufacturing carbon black, said reactor (100) comprising flow guide means (110) provided between a fuel burner (106) and an air inlet (108) for altering the flow path of combustion air entering at the air inlet (108) to result in a better mixing between the fuel and the combustion air, thereby, producing higher temperature hot combustion gases which are subsequently received in a reaction chamber (104) where they react with a carbonaceous feedstock to produce carbon black. The reactor (100) of the present invention increases the carbon black production by 5-20%. Further, the positioning of the flow guide means (110) stabilizes the flame from the fuel burner (106) to maintain it along the reactor axis, thus, increasing the life of the refractory lining (114).

9 Claims, 2 Drawing Sheets

(56) References Cited

OTHER PUBLICATIONS

Figure 1:
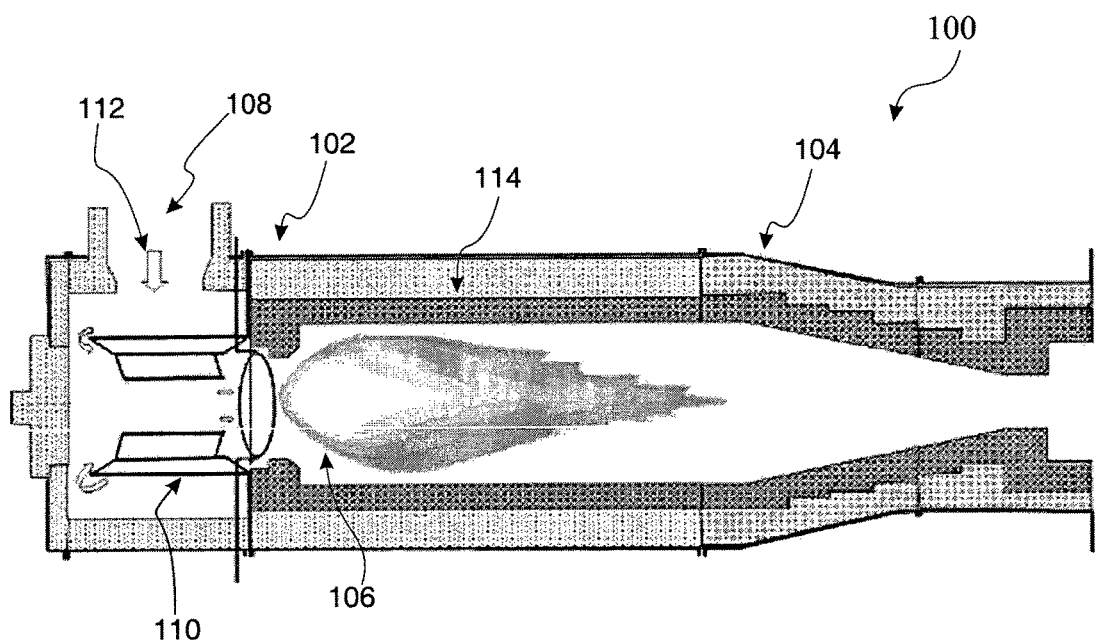

Notice of Reasons for Refusal issued on Jul. 1, 2014 by the JPO for application 2013-506812, filed on Apr. 19, 2011 (Applicant—Aditya Birla Nuvo Limited, et al. //Inventor—Rodriguez, et al.) (Translation Only—1 page).
Decision of Refusal issued on Jun. 30, 2015 by the JPO for application 2013-506812, filed on Apr. 19, 2011 (Applicant—Aditya Birla Nuvo Limited, et al. //Inventor—Rodriguez, et al.) (Translation Only—2 pages).
Decision to grant a patent issued on Jun. 26, 2015 for application 2012150085, filed on Apr. 19, 2011 an issued as RU 2572893 on Dec. 16, 2015 (Applicant—Aditya Birla Sci. Tech. Co., Ltd.) (Original—8 pages // Translation—7 pages).
Notice of Reasons for Refusal issued on Jul. 26, 2016 by the JPO for aplication 2015-214450, filed on Oct. 30, 2015 (Applicant—Aditya Birla Nuvo Limited, et al. //Inventor—Rodriguez, et al.) (Translation Only—3 pages).
Communication pursuant to Article 94(3) EPC mailed on Aug. 23, 2016 for application EP 11774540.6, filed on Apr. 19, 2011 (Applicant—Aditya Birla Nuco Limited) (9 pages).
Decision of Refusal was issued on Apr. 4, 2017 by the Japanese Patent Office for JP Application No. 2015-214450, which was filed on Oct. 30, 2015 and published as JP 2016053176 A on Apr. 14, 2016 (Applicant—Aditya Birla Nouveau Limited)(Original—3 pages//Translated—3 pages).

* cited by examiner

CARBON BLACK REACTOR

FIELD OF INVENTION

The present invention relates to a reactor for manufacturing carbon black.

Particularly, the present invention relates to a reactor for better mixing carbonaceous feedstock and combustion air while manufacturing carbon black.

BACKGROUND

The process for manufacturing carbon black typically comprises, performing partial pyrolysis of a carbonaceous feedstock, where, the feedstock can be in the form of a gas or liquid. While several processes have been used to obtain carbon black, the most commonly used process is the furnace black process in which carbon black is produced by incomplete combustion of a liquid feedstock comprising heavy petroleum products such as FCC tar, coal tar, and ethylene cracking tar.

In the furnace black process, a hydrocarbon fuel such as natural gas or fuel oil is burned with an excess amount of oxygen typically supplied as a flow of air or an oxygen containing gas in a space having a lining of fire resistant material to produce hot combustion gas. The liquid feedstock to be thermally decomposed and dehydrogenated is sprayed into the hot combustion gas to obtain an aerosol containing carbon black particles suspended in the gas. The carbon black particles in the form of a fluffy powder are separated from the gas and collected. The collected particles are subsequently pelletized by means of conventional pelletizing methods. This carbon black is used in manufacturing pneumatic tires for automobiles and aircraft, as a reinforcing filler for an elastomer, as pigment or colorant for plastic, paint, and printing ink.

The reactors used for the furnace black process generally comprise, a combustion chamber, a mixing chamber, and a reaction chamber, arranged along the axis of the reactor to form a flow path for the reaction media from the combustion chamber through the mixing chamber to the reaction chamber. The liquid feedstock is normally sprayed into the mixing chamber to achieve intensive mixing of the liquid feedstock with the hot combustion gases. This mixture then enters the reaction chamber where the actual carbon black formation process takes place. Finally, the reaction is stopped downstream by spraying water.

The factors that influence the carbon black formation are: the excess air/oxygen in the hot combustion gases, the temperature of the hot combustion gases, efficiency of combustion of the fuel, and the reaction or residence time from the mixing of the feedstock in the hot combustion gases to the completion of the reaction. The combustion efficiency of the fuel depends largely on the mixing of the fuel with the combustion air/oxygen. Typically, the combustion air is preheated to a temperature between 800° C. and mixed with the fuel in the combustion chamber to obtain the hot combustion gases. An improvement in the mixing between the combustion air and the fuel results in increased combustion efficiency and thus higher temperature of hot combustion gases. In general, the higher the temperature of the hot combustion gases, the smaller the particles of carbon black formed.

Several attempts have been made in the past to provide carbon black reactors which improve the furnace black process resulting in, higher efficiency, a better process control, and produce carbon black grades having different fineness. Some of these disclosures are listed in the prior art below:

U.S. Pat. No. 7,625,527 discloses a carbon black reactor which increases the contact efficiency between hot combustion gases and feedstock to increase the conversion rate of the feedstock to carbon black. The carbon black reactor comprises: a combustion zone for generating the hot combustion gases, a reaction zone having two or more points to introduce feedstock therein for producing carbon black by contacting the combustion gases with the feedstock introduced in a plurality of divided flows, a quench zone for stopping the reaction by injecting a coolant, where, the three zones are arrayed laterally in order. The carbon black reactor gives carbon black having uniform characteristics, especially distribution of aggregation size.

CN Patent No. 2341708 discloses a reactor for a carbon black-surface oxidating and fluidizing bed. The reactor comprises: a reactor body, a furnace black inlet, a furnace black outlet, a compound distributing board, an air chamber, an air inlet, and an air outlet, wherein, three to seven baffles are arranged in the reactor comprising four to eight fluidizing chambers to obtain a multi-stage mixed flow. The reactor is simple to manufacture, low cost, and produces carbon black used for coloration in various industries.

U.S. Pat. No. 4,590,040 discloses a carbon black reactor which is adapted to reduce the pressure drop due to excessive turbulence in the pre-combustion zone. The carbon black reactor comprises: a precombustion zone with a cylindrical sidewall and having an upstream end and a downstream end, a plurality of tunnels for conveying combustion gases, the tunnels opening tangentially into the precombustion zone through the sidewall, and a plurality of semicircular ramps positioned in the precombustion zone to define the upstream end for guiding the flow of the tangentially introduced stream of combustion gases. The arrangement prevents a turbulent impact between other tangentially introduced gas streams to reduce the pressure drop therein.

U.S. Pat. No. 4,347,218 discloses an apparatus for producing carbon black grades of different fineness, while in particular preventing thermal overstressing of the reactor in the intake area of hydrocarbon and air. The apparatus comprises: a reactor including a reaction chamber for forming carbon black, a plurality of unjacketed feed units for supplying air to the reaction chamber and spraying hydrocarbon into the air near a discharge end, and a heat exchanger for controlling the temperature of the reactor output gases and carbon black produced therein.

US Application No. 2004213728 discloses a process for the production of furnace black in a furnace black reactor having a flow axis. The process comprises: introducing fuel and combustion air into a gas burner, jetting steam axially through the gas burner, producing thereby a flow of hot combustion gases in a combustion chamber; feeding the hot combustion gases along the flow axis from the combustion chamber through a narrow point into a reaction zone, mixing carbon black raw material into the flow of hot combustion gases upstream of, inside, or downstream of the narrow point; stopping the reaction downstream in the reaction zone by spraying water. The process produces deep-colored furnace blacks in the furnace reactor.

The prior art listed above discloses carbon black reactors adapted to provide an increased process efficiency, enhanced process control or produce carbon black grades of different fineness. The present invention provides one such carbon black reactor, mainly adapted to enhance mixing between the combustion air/oxygen and fuel, to increase the combustion efficiency and provide hot combustion gases having a higher temperature. Further, the present invention provides a carbon black reactor comprising means that allow higher feedstock flow rate through the reactor, while maintaining the quality parameters of the carbon black.

OBJECTS OF THE INVENTION

An object of the present invention is to provide a reactor for manufacturing carbon black.

Another object of the present invention is to provide a reactor for improved mixing of combustion air and fuel in the combustion chamber during the manufacturing of carbon black.

Yet another object of the present invention is to provide a reactor comprising means that permit higher feedstock flow rate through the reactor without any loss of quality.

Still another object of the present invention is to provide a reactor for manufacturing carbon black which provides improved process productivity and enhanced product quality.

SUMMARY OF THE INVENTION

In accordance with the present invention, is disclosed a reactor for manufacturing carbon black using the furnace black process, said reactor including:
  a combustion chamber for producing hot combustion gases, said combustion chamber comprising:
    a fuel burner located along the operative longitudinal axis of said reactor;
    an air inlet located orthogonal to said fuel burner for receiving combustion air;
    flow guide means located along the operative longitudinal axis of said reactor positioned proximal to said fuel burner and between said fuel burner and said air inlet so as to be in the flow path of the combustion air for altering the flow path; and
  a reaction chamber located along the operative longitudinal axis of said reactor subsequent to said combustion chamber, said reaction chamber being adapted to receive the hot combustion gases from said combustion chamber and a carbonaceous feedstock to effect carbon black formation.

Typically, in accordance with the present invention, the flow guide means is a set of annular cylinders.

Alternatively, in accordance with the present invention, the flow guide means is a set of tapering annular cylinders.

Preferably, in accordance with the present invention, the flow guide means is at least one selected from the group consisting of uniform annular cylinders, tapering annular cylinders, baffles, vanes, fins, and the like.

Alternatively, in accordance with the present invention, the flow guide means is a set of annular cylinders provided with at least one means selected from baffles, vanes, and fines, along the operative length of the cylinders.

In accordance with the present invention, is disclosed a process for manufacturing carbon black comprising the steps of:
  burning a fuel in a fuel burner located along the operative longitudinal axis of a reactor for manufacturing the carbon black;
  receiving combustion air through an air inlet located orthogonal to said fuel burner;
  altering the flow path of the combustion air by means of flow guide means provided along the operative longitudinal axis of said reactor between said fuel burner and said air inlet proximal to said fuel burner;
  effecting advanced mixing between the combustion air and fuel in a combustion chamber to produce hot combustion gases having temperature in the range of 1000-2200° C.; and
  receiving the hot combustion gases in a reaction chamber located along the operative longitudinal axis of said reactor subsequent to said combustion chamber, which is fed with a carbonaceous feedstock to manufacture the carbon black.

Typically, in accordance with the present invention, the process includes the step of manufacturing a carbon black grade selected from the group of grades consisting of hard black and soft black.

BRIEF DESCRIPTION OF THE ACCOMPANYING DRAWINGS

Figure 2:
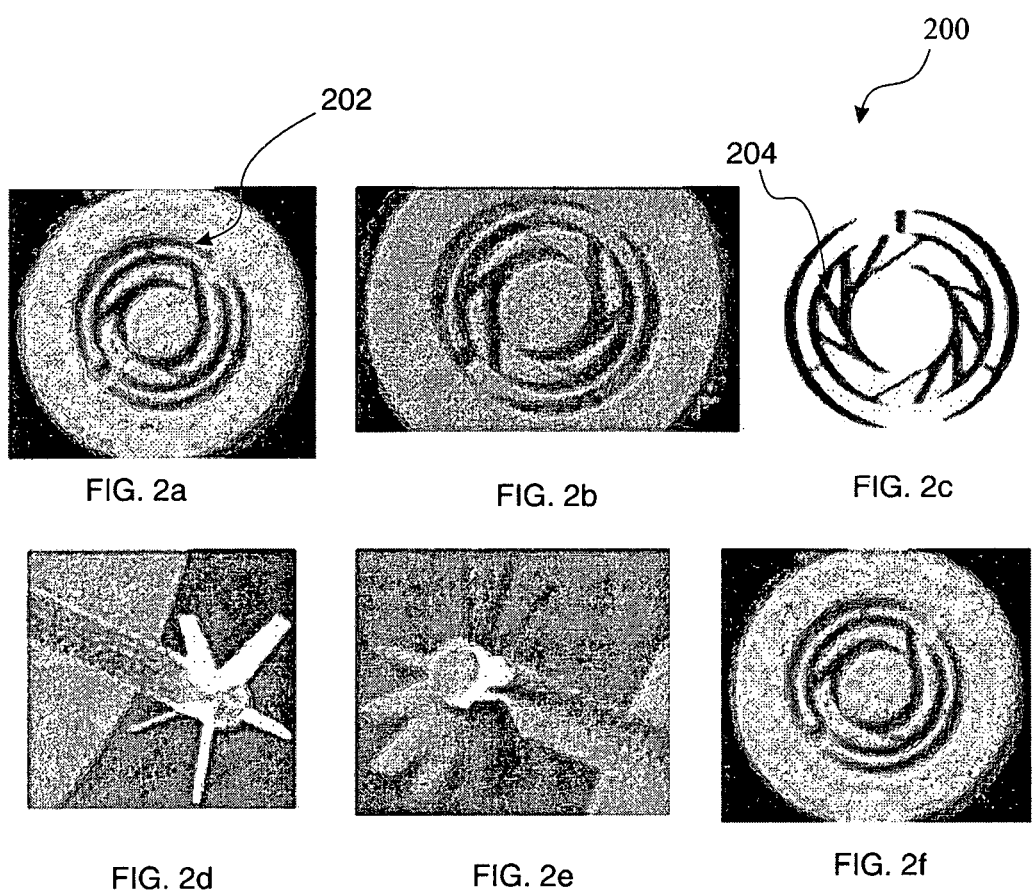

The invention will now be described with the help of the accompanying drawings, in which:

FIG. 1 illustrates a schematic diagram of the carbon black reactor showing the flow guide means in accordance with the present invention; and FIG. 2 illustrates a schematic of the alternative embodiments of the flow guide means provided in the carbon black reactor in accordance with the present invention.

DETAILED DESCRIPTION OF THE ACCOMPANYING DRAWINGS

The invention will now be described with reference to the accompanying drawings which do not limit the scope and ambit of the invention. The description provided is purely by way of example and illustration.

The present invention envisages a reactor for manufacturing carbon black and a furnace black process thereof. The reactor of the present invention is adapted to enhance mixing between combustion air and a fuel in a combustion chamber so as to increase the fuel combustion efficiency and produce hot combustion gases having a temperature in the range of 1000-2200° C. These hot combustion gases are subsequently reacted with a carbonaceous feedstock in a reaction chamber to obtain carbon black. The present invention provides up to 20% increase in the carbon black production.

Referring to FIG. 1, therein is illustrated a carbon black reactor in accordance with the present invention, the reactor is generally represented in FIG. 1 by numeral 100. The reactor 100 comprises: a combustion chamber 102 having a fuel burner 106, an air inlet 108, and flow guide means 110; and a reaction chamber 104 along the longitudinal flow axis of the reactor 100 subsequent to the combustion chamber 102. In the combustion chamber 102 a hydrocarbon fuel such as fuel oil or natural gas is burned in the presence of an excess amount of oxygen typically supplied as a flow of air, referred hereto as combustion air, to produce hot combustion gases. In the combustion chamber 102, the fuel burner 106 is located along the operative longitudinal axis of the reactor 100 and the air inlet 108 is typically located orthogonal to the fuel burner 106. The combustion air enters at the air inlet 108 and traverses towards the fuel burner 106.

The flow guide means 110 is positioned in the flow path of the combustion air between the fuel burner 106 and the air inlet 108. The flow guide means 110 are located along the operative longitudinal axis of the reactor 100 such as to be proximal to the fuel burner 106 than the air inlet 108. The combustion air that enters at the air inlet 108 follows the flow path denoted by 112 in the FIG. 1. The flow path 112 of the combustion air is altered by means of the flow guide means 110 before contacting the fuel at the fuel burner 106. Due to the modification in the flow path 112 of the combustion air the mixing between the fuel and the combustion air is enhanced which results in increased fuel combustion efficiency and thereby providing hot combustion gases having a higher temperature, typically in the range of 1000-2200° C. The flow guide means 110 further aid in stabilizing the flame of the fuel burner 106 and maintaining the flame along the operative longitudinal axis of the reactor 100. This helps in increasing the life of the refractory lining 114 of the reactor 100.

The flow guide means 110 is at least one selected from the group consisting of uniform annular cylinders, tapering annular cylinders, baffles, vanes, fins, and the like. The flow guides means 110 may be a set of annular cylinders (as illustrated in FIG. 1) or a set of tapering annular cylinders (not shown in Figure). Further, these annular cylinders may be provided with a plurality of vanes, baffles or fins on the inside wall, along the length of the cylinders, a schematic of which is shown in FIG. 2. Still further, a plurality of annular cylinders, tapering or uniform, may be provided with a plurality of vanes or fins on the inside of the innermost annular cylinder. Referring to FIG. 2, the various alternative embodiments of the flow guide means 110 are illustrated in FIGS. 2a, 2b, 2c, & 2f, where, vanes or fins 204 are placed on the inside of annular cylinders 202. The vanes/fins 204 are illustrated in FIGS. 2d & 2e.

Due to the flow guide means 110, the temperature of the hot combustion gases, thus obtained, is increased. These hot combustion gases traverse through the reactor 100 from the combustion chamber 102 to the reaction chamber 104. In the reaction chamber 104, these gases interact with a carbonaceous feedstock to produce carbon black. By using the flow guide means 110, the carbon black production is increased by 5-20%. The reactor of the present invention and the process thereof is suitable for manufacturing hard black or soft black grade carbon black.

Test Results

The invention will now be described with respect to the following examples which do not limit the scope and ambit of the invention in anyway and only exemplify the invention.

Example 1

TABLE 1

Comparative analysis for a furnace black process with flow guide means 110 and without flow guide means.

| Grade (N234) | | With flow guide means 110 Run 1 | Without flow guide means Run 2 | Without flow guide means Run 3 |
|---|---|---|---|---|
| Process air | Nm³/hr | 16000 | 16000 | 16000 |
| Feedstock flow | Kg/hr | 4350 | 4100 | 3700 |
| Carbon Black produced | Kg/hr | 2349 | 2214 | 1998 |
| % increase in production with respect to Run 2 | % | 5.75 | | |
| % increase in production with respect to Run 3 | % | 14.94 | | |

It is observed from TABLE 1 that when the flow guide means 110 were used the carbon black production was increased by 5.75%, in comparison with when no flow guide means were used at a feedstock flow rate of 4100 kg/hr, and, the carbon black production was increased by 14.94% in comparison with when no flow guide means were used at a feedstock flow rate of 3700 kg/hr. Further, the fuel consumption was also reduced when the flow guide means 110 used.

Example 2

TABLE 2

Comparative analysis for a furnace black process with flow guide means 110 and without flow guide means.

| Grade (N375) | | With flow guide means 110 Run A | Without flow guide means Run B | Without flow guide means Run C |
|---|---|---|---|---|
| Process air | Nm³/hr | 16000 | 16000 | 16000 |
| Feedstock flow | Kg/hr | 4750 | 4350 | 4200 |
| Carbon black produced | Kg/hr | 2897.5 | 2653.5 | 2562 |
| % increase in production with respect to Run B | % | 9.195 | | |
| % increase in production with respect to Run C | % | 13.09 | | |

It is observed from TABLE 2 that when the flow guide means 110 were used the carbon black production was increased by 9.195%, in comparison with when no flow guide means were used at a feedstock flow rate of 4350 kg/hr, and, the carbon black production was increased by 13.09% in comparison with when no flow guide means were used at a feedstock flow rate of 4200 kg/hr. Further, the fuel consumption was also reduced when the flow guide means 110 used.

TECHNICAL ADVANTAGES

A reactor for manufacturing carbon black, in accordance with the present invention, comprises flow guide means located along the operative longitudinal axis of said reactor between a fuel burner and an air inlet being adapted to alter the flow path of combustion air entering at the air inlet to result in a better mixing between the fuel and the combustion air, thereby, producing higher temperature hot combustion gases which are subsequently received in a reaction chamber where they react with a carbonaceous feedstock to produce carbon black; the reactor and process thereof as described in the present invention have several technical advantages including but not limited to the realization of:
  the reactor of the present invention increases the carbon black production by 5-20% in comparison with a reactor not comprising the flow guide means; and
  the positioning of the flow guide means further helps in stabilizing the flame of the fuel burner by maintaining its direction along the operative longitudinal axis of the reactor, thereby, increasing the life of the reactor refractory lining.
  the flow guide means increase the feedstock flow rate by 5-20% in comparison with a reactor not comprising the flow guide means The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary. Wherever a range of values is specified, a value up to 10% below and above the lowest and highest numerical value respectively, of the specified range, is included in the scope of the invention.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A reactor for manufacturing carbon black using the furnace black process, said reactor including:
   a combustion chamber for producing hot combustion gases, said combustion chamber comprising:
     a fuel burner located along the operative longitudinal axis of said reactor;
     an air inlet located orthogonal to said fuel burner for receiving combustion air;
     flow guide means comprising a plurality of tapering annular cylinders, located along the operative longitudinal axis of said reactor positioned proximal to said fuel burner and between said fuel burner and said air inlet so as to be in the flow path of the combustion air for altering the flow path; and
   a reaction chamber located along the operative longitudinal axis of said reactor subsequent to said combustion chamber, said reaction chamber being adapted to receive the hot combustion gases from said combustion chamber and a carbonaceous feedstock to effect carbon black formation.

2. A reactor for manufacturing carbon black using the furnace black process, said reactor including:
   a combustion chamber for producing hot combustion gases, said combustion chamber comprising:
     a fuel burner located along the operative longitudinal axis of said reactor;
     an air inlet located orthogonal to said fuel burner for receiving combustion air;
     flow guide means comprising a plurality of annular cylinders having a baffle, vane, fine, or a combination thereof disposed along the operative length of at least one of the plurality of annular cylinders, wherein the glow guide means is located along the operative longitudinal axis of said reactor positioned proximal to said fuel burner and between said fuel burner and said air inlet so as to be in the flow path of the combustion air for altering the flow path; and
   a reaction chamber located along the operative longitudinal axis of said reactor subsequent to said combustion chamber, said reaction chamber being adapted to receive the hot combustion gases from said combustion chamber and a carbonaceous feedstock to effect carbon black formation.

3. The reactor of claim 2, wherein the flow guide means comprises a plurality of annular cylinders having a plurality of baffles, vanes, fins, or a combination thereof disposed along the operative length of at least one of the plurality of annular cylinders.

4. The reactor of claim 2, wherein the flow guide means comprises a plurality of annular cylinders having one or more baffles, vanes, fins, or a combination thereof, along the operative length of the plurality of annular cylinders and positioned on an inside portion of an innermost cylinder of the plurality of annular cylinders.

5. A process for manufacturing carbon black comprising the steps of:
   burning a fuel in a fuel burner located along the operative longitudinal axis of a reactor for manufacturing the carbon black;
   receiving combustion air through an air inlet located orthogonal to said fuel burner;
   altering the flow path of the combustion air by means of flow guide means comprising a plurality of annular cylinders having a baffle, vane, fine, or a combination thereof disposed along the operative length of at least one of the plurality of annular cylinders, wherein the flow guide means is disposed along the operative longitudinal axis of said reactor between said fuel burner and said air inlet proximal to said fuel burner;
   effecting advanced mixing between the combustion air and fuel in a combustion chamber to produce hot combustion gases having temperature in the range of 1000-2200° C.; and
   receiving the hot combustion gases in a reaction chamber located along the operative longitudinal axis of said reactor subsequent to said combustion chamber, which is fed with a carbonaceous feedstock to manufacture the carbon black.

6. The process of claim 5, wherein the flow guide means comprises a plurality of annular cylinders having a plurality of baffles, vanes, fins, or a combination thereof disposed along the operative length of at least one of the plurality of annular cylinders.

7. The process of claim 5, wherein the flow guide means comprises a plurality of annular cylinders having one or more baffles, vanes, fins, or a combination thereof, along the operative length of the plurality of annular cylinders and positioned on an inside portion of an innermost cylinder of the plurality of annular cylinders.

8. A process for manufacturing carbon black comprising the steps of:
   burning a fuel in a fuel burner located along the operative longitudinal axis of a reactor for manufacturing the carbon black;
   receiving combustion air through an air inlet located orthogonal to said fuel burner;
   altering the flow path of the combustion air by means of flow guide means comprising a plurality of tapering annual cylinders provided along the operative longitudinal axis of said reactor between said fuel burner and said air inlet proximal to said fuel burner;
   effecting advanced mixing between the combustion air and fuel in a combustion chamber to produce hot combustion gases having temperature in the range of 1000-2200° C.; and
   receiving the hot combustion gases in a reaction chamber located along the operative longitudinal axis of said reactor subsequent to said combustion chamber, which is fed with a carbonaceous feedstock to manufacture the carbon black.

9. The process of claim 8, wherein the manufactured carbon black comprises a hard grade carbon black or a soft black grade carbon black.

\* \* \* \* \*